United States Patent [19]
Biddulph et al.

[11] Patent Number: 5,091,119
[45] Date of Patent: Feb. 25, 1992

[54] LIQUID-GAS CONTACT DEVICE

[75] Inventors: Michael W. Biddulph, University Park; Satish C. Kler, Woking; John T. Lavin, Guildford, all of England

[73] Assignee: The BOC Group plc, Windlesham, England

[21] Appl. No.: 410,381

[22] Filed: Sep. 20, 1989

[30] Foreign Application Priority Data

Sep. 23, 1988 [GB] United Kingdom ............ 8822479

[51] Int. Cl.⁵ .............................................. B01F 3/04
[52] U.S. Cl. ............................................... 261/114.3
[58] Field of Search ................................... 261/114.3

[56] References Cited

U.S. PATENT DOCUMENTS

| | | | |
|---|---|---|---|
| 2,705,699 | 4/1955 | Bresee | 202/160 |
| 2,784,953 | 3/1957 | Ng | 261/114.3 |
| 3,105,105 | 9/1968 | Kittel | 261/114.3 |
| 3,467,365 | 9/1969 | Webster | 261/114.3 |
| 4,184,857 | 1/1980 | Iijima et al. | 261/114.3 |
| 4,275,021 | 6/1981 | Kirkpatrick et al. | 261/114.3 |

FOREIGN PATENT DOCUMENTS

| | | | |
|---|---|---|---|
| 0022158 | 1/1981 | European Pat. Off. | 261/114.3 |
| 2617960 | 11/1977 | Fed. Rep. of Germany | |
| 1099973 | 6/1984 | U.S.S.R. | |
| 688353 | 3/1953 | United Kingdom | 261/114.3 |
| 1143772 | 2/1969 | United Kingdom | |
| 1250703 | 10/1971 | United Kingdom | 261/114.3 |
| 1482885 | 8/1977 | United Kingdom | |

OTHER PUBLICATIONS

Soviet Inventions Illustrated Section Ch Week 8504 6 Mar. 1985 Derwent Publications Ltd. London & SU A 594 (Gas Processing Res).

Primary Examiner—Tim Miles
Attorney, Agent, or Firm—Robert I. Pearlman; David M. Rosenblum; Carol A. Nemetz

[57] ABSTRACT

A liquid-gas contact device comprising a liquid-gas contact tray comprising a multiplicity of the elongate apertures in the tray for the passage of gas from below to above the tray, each aperture having a gas deflector associated therewith in being so disposed as to impart to the gas a component of velocity in the general direction of liquid flow, and at least several liquid flow in impedance members arranged so as to control the liquid velocity on the liquid-bearing surface to prevent it from reaching so great a magnitude that the residence time of liquid on the tray is insufficient for adequate gas-liquid contact to take place. Preferably the tray comprises a sheet of expanded metal.

15 Claims, 5 Drawing Sheets

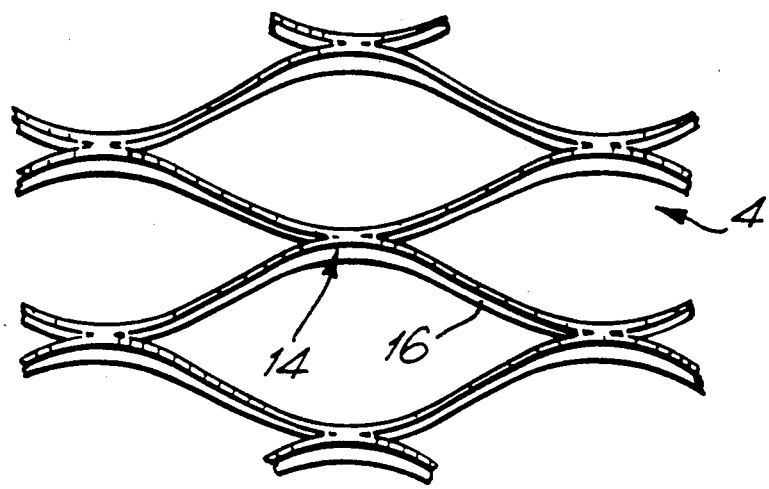
FIG.6.
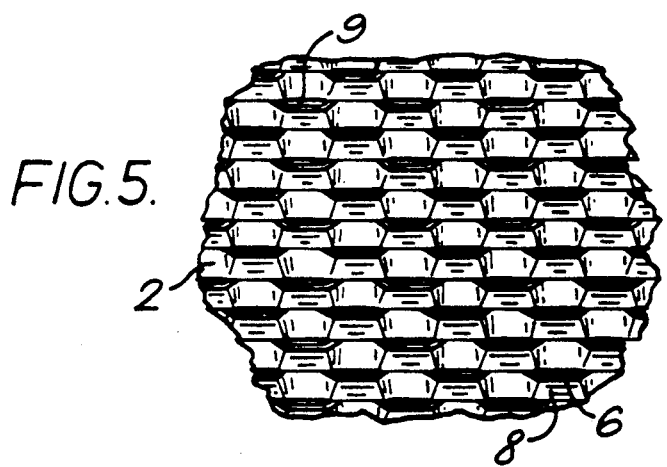
FIG.5.
FIG.7.
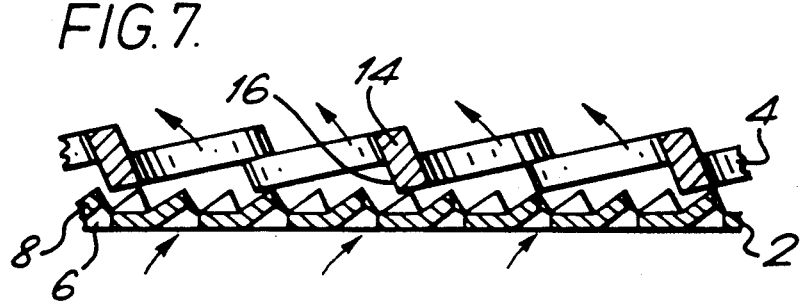

LIQUID-GAS CONTACT DEVICE

TECHNICAL FIELD

This invention relates to contacting liquid and gas. The term "gas" as used herein includes vapour within its scope.

BACKGROUND OF THE PRIOR ART

Efficient mass exchange between liquid and gaseous phases is the key to successfully performing a range of different chemical engineering operations including distillation. Distillation is performed industrially to separate single components from fluid mixtures comprising two or more components. In a distillation column contact between the liquid phase and gaseous phase is carried out on vertically spaced horizontal trays. Liquid flows down the column from tray to tray and comes into contact with gas ascending the column through passages formed in the trays. Bubble cap trays were the first kind of trays to be used in large-scale distillation operations. These trays have a multiplicity of tubular risers which extend upwardly from the surface of the tray and are covered by caps with serrated edges or slots so that the gas can pass through the caps into the liquid on the surface of the trays. Bubble cap trays provide intimate contact between gas and liquid but are expensive to fabricate and are in operation subject to high gas pressure drops thereby increasing the work that has to be done to separate the fluid mixture. This latter disadvantage becomes particularly significant when the fluid mixture comprises two or more components which have similar volatilities to one another. Air is an example of such a mixture.

Accordingly, distillation columns used in, for example, modern air separation plants have sieve trays (or plates) instead of bubble cap trays. The construction of a sieve tray is simple. It is generally circular in shape and has a multiplicity smooth-edged circular apertures each having a vertical axis. In comparison with bubble cap trays, sieve trays have a number of advantages. First, the pressure drop as the gas flows through each tray is less. Second, the trays are easier and cheaper to fabricate and maintain.

Nevertheless, the pressure drop associated with commercial sieve trays is still significant. We have therefore set ourselves the goal of improving upon known sieve trays.

The pressure drop can be reduced by increasing the percentage open or perforate area on the surface of each tray. We have found that an attempt to increase the percentage of perforate area on each tray by changing the number and diameter of the apertures can lead to reduced point efficiency, that is the ratio between the actual separation obtained on the tray and a separation which would be obtained if thermodynamic equilibrium between gas and liquid were obtained at any point on the tray. Moreover, altering the size of the apertures does not help to counteract the tendency towards low point efficiencies at peripheral regions of the tray not lying on a straight line path between the inlet and chordal outlet of the tray. This tendency results from lower liquid flow rates over such regions of the tray.

Proposals have been made to improve the distribution of liquid on a sieve tray by imparting to the gas a component of velocity in the desired direction of the liquid flow. For example, it has been proposed to cover a conventional perforate sieve tray with a layer of expanded metal having slats which give the gas just such a component of velocity (See UK patent specification 1143772). However, this expedient does not give a total solution to the problem of a stagnant liquid and also adds to the pressure drop. Proposals have also been made to provide a sieve tray with additional gas passages formed such that the gas is given a component of the velocity in a desired direction. (See for example U.S. Pat. No. 3,759,498). Such trays tend to have a poor turn down ratio, that is to say that they operate efficiently only within a relatively narrow range of liquid loading. Other proposals in the art include the use of vertical baffles extending well above the height of the liquid on the tray to control liquid flow. Such baffles tend to reduce the liquid-velocity and lead to the tray having poor turn down and other characteristics (see Soviet Union patent specification 1 099 973).

SUMMARY OF THE INVENTION

It is an aim of the present invention to provide a liquid-vapour contact device which for a given duty is capable of being made with a combination of pressure drop, turn down and liquid distribution characteristics superior to those of a conventional sieve tray.

According to the present invention there is provided a liquid-gas contact device comprising a liquid-gas contact tray having a liquid-bearing surface along which in use liquid is able to flow from a liquid receiving edge of the surface to an opposed liquid outlet edge thereof, a multiplicity of elongate apertures in the tray for the passage of gas from below to above the tray, each aperture having a gas deflector associated therewith and being so disposed as to impart to the gas a component of velocity in the general direction of liquid flow, and at least several liquid flow impedance members overlying the liquid-bearing surface between said liquid receiving edge and said outlet edge, the deflectors and flow impedance members having a height such that in operation of the device they are submerged in the liquid flowing thereacross.

Each elongate aperture is preferably formed as a slit and has a tongue associated therewith which functions as the gas deflector. In use the tongues give the gas a component of velocity in the direction of the tray outlet causing the gas to urge the liquid towards the outlet. Each slit is preferably disposed such that its longer dimension is parallel to the inlet and outlet edges of the tray. The liquid flow impedance members take the form of weirs or baffles disposed and arranged so as to control the liquid velocity on the liquid-bearing surface to prevent it from reaching so great a magnitude that the residence time of the liquid on the tray is insufficient for adequate gas-liquid contact to take place. The weirs extend across the tray from side-to-side and are longitudinally spaced.

Preferably the tray comprises a sheet of expanded metal. When the tray is formed of expanded metal, the baffles are preferably provided by strands in a second sheet of expanded metal of larger mesh than the sheet forming the tray. Thus, a liquid-gas device according to the invention may be formed of just two sheets of expanded metal, thereby making fabrication particularly simple in comparison with prior art trays of the kind requiring a complex distribution of different types of aperture for controlling gas and liquid distribution.

The expanded metal that forms the lower sheet may be selected in accordance with the physical properties of the components to be contacted with one another and with the range of liquid gas flow rates to which the tray is to be subjected in use. In general, a larger proportion of the surface area of the lower sheet can be perforate or open, the greater the surface tension and viscosity of the liquid phase. Further, the greater the gas flow rate, the larger can be the proportion of the surface area of the lower sheet that can be perforate. Typically, the expanded metal has a percentage open area of 15 to 50%. A percentage open area of 20 to 30% is useful for distilling air. The slit size may vary quite considerably. In some embodiments of contact device according to the invention the aspect ratio of the slits may be in the range of from 2:1 to 5:1. The average size of each slit may for example be less than 1 mm in the shorter dimension and less than 2.5 mm in the longer dimension. These dimensions and aspect ratios are not critical. Indeed, in an alternative embodiment of the invention, an expanded metal tray having slits each with an aspect ratio of about 7.5 to 1, a longer dimensions of about 15 mm and a shorter dimension of 2 mm have been employed. The slits may for example be generally trapezoidal, pentagonal or hexagonal.

Preferably, the expanded metal that forms the upper sheet may have a mesh size in the general direction of liquid flow of 2 to 5 cm. This mesh size is not critical. Larger mesh sizes of up to about 10 cm or smaller mesh sizes down to about 1 cm may be used depending on the components to be contacted with one another. Instead of the upper sheet of expanded metal an arrangement of separate weirs can be employed with a spacing between adjacent weirs in the direction of liquid flow of preferably 2 to 5 cm although larger or smaller spacings may be used depending on the components to be contacted with one another. The baffles may be vertical or may be inclined towards the inlet end of the tray.

BRIEF DESCRIPTION OF THE DRAWINGS

Gas-liquid contact devices according to the invention will now be described by way of example with reference to the accompanying drawings, in which:

FIG. 5 is a perspective view of a fragment of expanded metal suitable as an alternative lower sheet in FIG. 1;

FIG. 6 is a perspective view of a fragment of expanded metal suitable for use as the upper sheet in FIG. 1;

FIG. 7 is a schematic sectional elevation of the tray shown in FIG. 1 employing the sheets shown in FIG. 5 and 6;

DETAILED DESCRIPTION OF THE INVENTION

Figure 1:
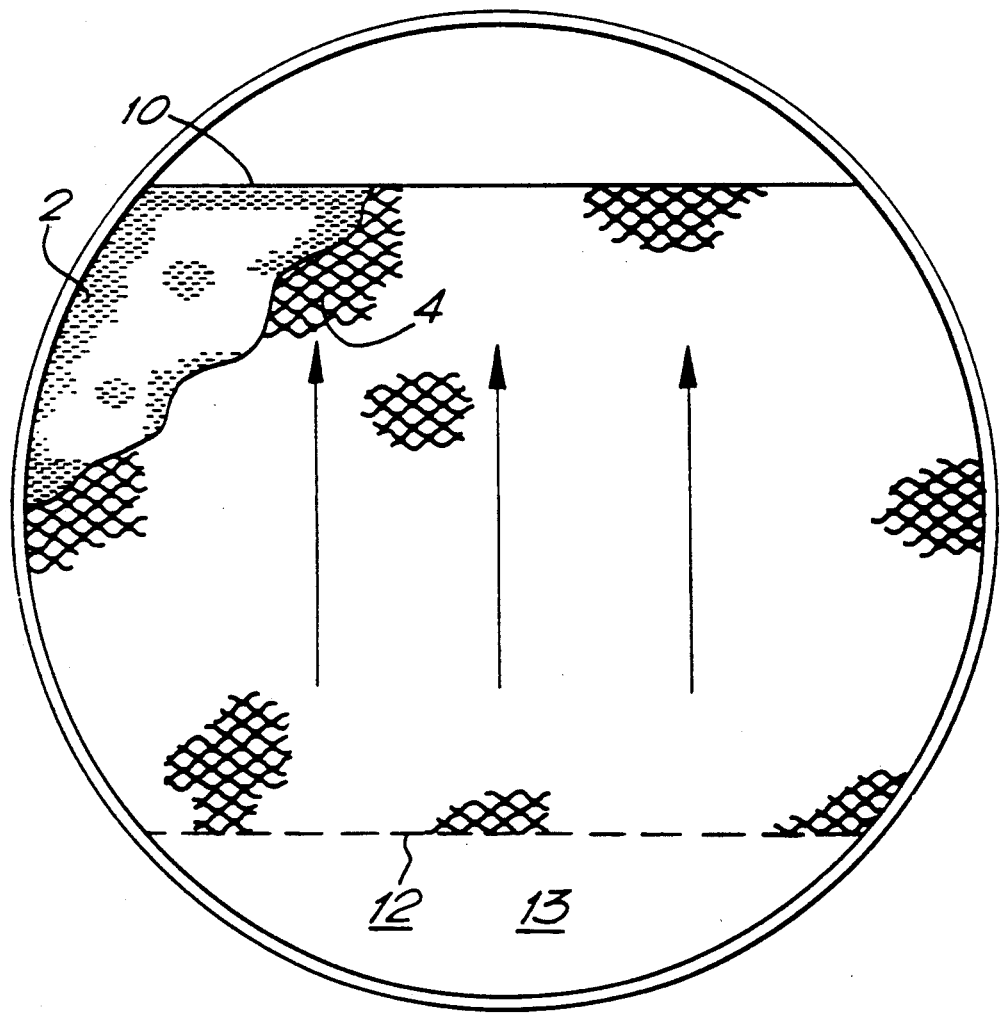
FIG. 1 is a schematic plan view of a first tray according to the invention comprising upper and lower sheets of expanded metal.

Referring to FIGS. 1 to 4 of the drawings, a liquid-gas contact device according to the invention is generally circular in shape but with a segment cut away and comprises a lower sheet 2 of a relatively small mesh expanded metal and an upper sheet 4 of a relatively large mesh expanded metal. The upper sheet 4 lies on the lower sheet 2. It is secured to the lower sheet 2. The two sheets may for example be tack welded together. The lower sheet 2 has narrow slits 6 formed therein. Each slit 6 has an associated tongue 8. Each slit 6 may on the underface of the sheet 2 have openings which are typically trapezoidal in shape. One pair of opposed sides of the trapezoidal undersurface of the slit is longer than the other pair of opposed sides, and the longer sides extend generally parallel to the inlet and outlet of the tray, but generally transversely to the general direction of the liquid flow. The longer sides are typically less than 0.5 mm apart, which the average length of the longer sides is typically in the order of 2 mm. The tongues 8 each cooperate with their respective slits 6 to define on the top surface of the tray, openings 9 facing the direction of the outlet edge of the tray. These openings are also slit-shaped and typically when viewed along the respective tongues 8 have dimensions similar to those of the slits 6 at their undersurfaces, though the area of the opening 9 is generally larger than that of the undersurface of the respective slits. As measured on the under surface of the sheet 2, the total area of the apertures defined by the openings 9 generally amounts to at least 15% and typically up to 50% of the area of the tray—that is to say the tray has a percentage open area of at least 15%.

Figure 9A:
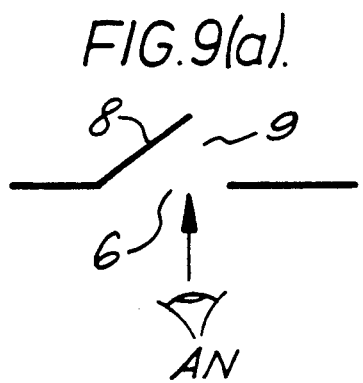
FIGS. 9 (a) and (b) and FIGS. 10 (a) to 10 (d) are schematic diagrams illustrating the slits 6 in a tray according to the invention.
Figure 9B:
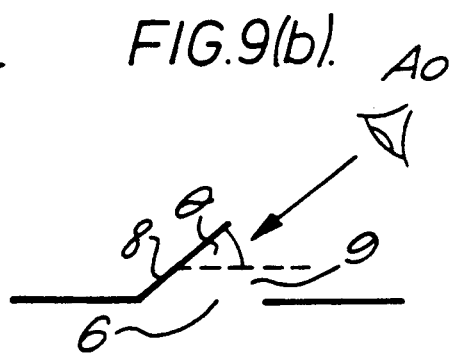
Figure 10A:
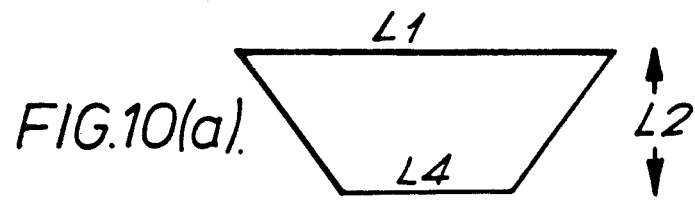
Figure 10B:
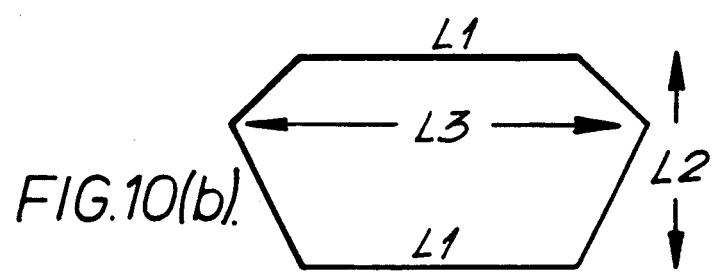
Figure 10C:
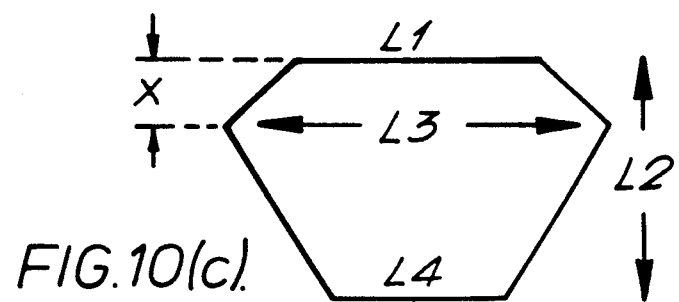
Figure 10D:
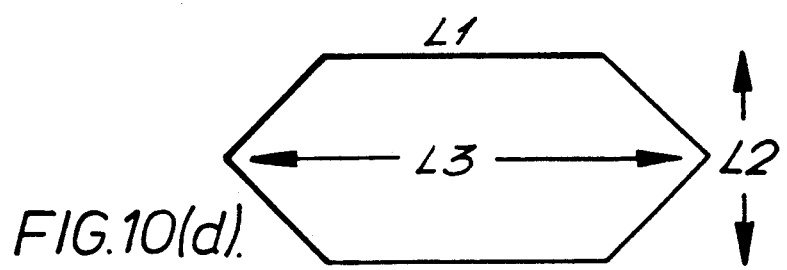

The method of calculating the total open area is now described with reference to FIGS. 9 and 10 of the accompanying drawings. FIG. 9 (a) illustrates a single slit 6 having a tongue 8 which defines an opening 9 with the surface of the tray. The slit 6 may for example be of any one of the shapes shown in FIGS. 10 (a) to (d). When viewed normally the slits 6 shown in FIGS. 10 (a) to (d) have respective areas (AN) given by the formulae:

$$AN = \frac{(L1 - L4)}{2} \cdot L2 \qquad \text{FIG. 10 (a)}$$

$$AN = \frac{(L3 - L1)}{2} \cdot L2 \qquad \text{FIG. 10 (b)}$$

$$AN = \frac{(L1 + L3)}{2} X + \frac{(L3 + L4)}{2} \cdot (L2 - X) \qquad \text{FIG. 10 (c)}$$

$$AN = \frac{(L3 + L1)}{2} \cdot L2 \qquad \text{FIG. 10 (d)}$$

where L1, L2, L3, L4 and X are the dimensions shown in the respective Figures.

Since, however, the area of each opening 9 when viewed at an angle theta, where theta is the angle the slit makes with surface of the tray, is the area which determines the initial area of contact between gas and liquid phases as the liquid flows along the tray, the effective open area of the tray is the sum of the aforesaid area of each such opening. The area of each opening (Ao) is:

$Ao = AN \sin(\text{theta})$ and the percentage open area is:

$$\frac{SAo}{T} \cdot 100\%$$

where S is the total number of slits 6 on the tray and T is the total area defined by the periphery of the tray.

Figure 4:
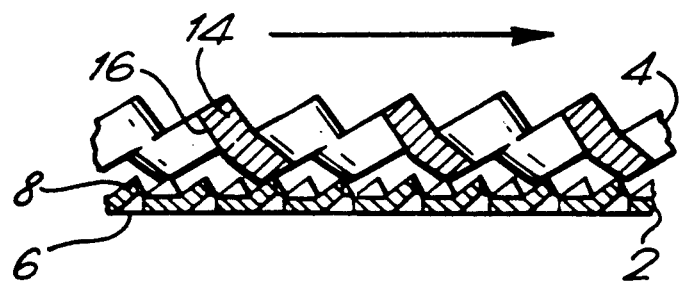
FIG. 4 is a schematic sectional of elevation of a portion of the tray shown in FIG. 1 employing the sheets in FIG. 2 and FIG. 3.

In operation, liquid flows continuously onto an inlet portion 12 of the tray or device from a seal pan 13 (associated with a downcomer) or other liquid distribution device. The liquid flows continuously across the tray in a direction of the outlet edge 10. As the liquid flows across the tray or device so it comes into contact with gas passing from below the surface of the lower sheet through the slits 6. In normal operation, a froth of gas and liquid is created on the surface area of the device, the height of the froth being such that the upper sheet 4 of the expanded metal is wholly submerged. The tongues 8 as can be seen from FIG. 4 are disposed at an angle to the vertical such that a component of velocity in the direction of the outlet edge 10 is imparted to the gas passing through the slit 6 and the liquid on the sheet 2 is urged towards the outlet 10. The forward momentum of the liquid is however reduced by the presence of flow impedance members in the form the strands 14 of the upper sheet 4 of expanded metal. A series of longitudinally spaced weirs are formed by the strands 14 and they zig-zag across the tray from one side to the other. The strands 14 have faces 16 which lean towards the inlet portion 12 of the tray. Moreover, the faces 16 are disposed at an angle relative to the outlet edge 10 such that liquid impacting against them tends to be given a component velocity in a direction parallel to the edge 10 thereby ensuring local mixing of the liquid. In general, the upper sheet 4 of expanded metal serves to limit or control the net forward velocity of the liquid-gas froth towards the outlet edge 10 of the tray and thus ensures there is an adequate residence time of liquid of the tray for there to be good liquid-gas contact. The level of the froth may typically be well above the tops of the flow impedance members. Moreover, it is found that the liquid-gas contact tray may be operated without there being a tendency for stagnant areas to occur at the periphery of the tray. Thus, it is possible to operate the tray at relatively high separation efficiency. Moreover, in comparison with conventional sieve trays, the tray according to the invention can be fabricated using a sheet 2 with a particularly large portion of its surface area taken up by slits 6 thereby keeping to a minimum the pressure drop associated with its use. The elongate shape of the slits 6 tends to counteract weeping, thus facilitating operation of the tray over a relatively wide range of liquid flow rates and gas velocities and with good turn down characteristics.

Figure 8:
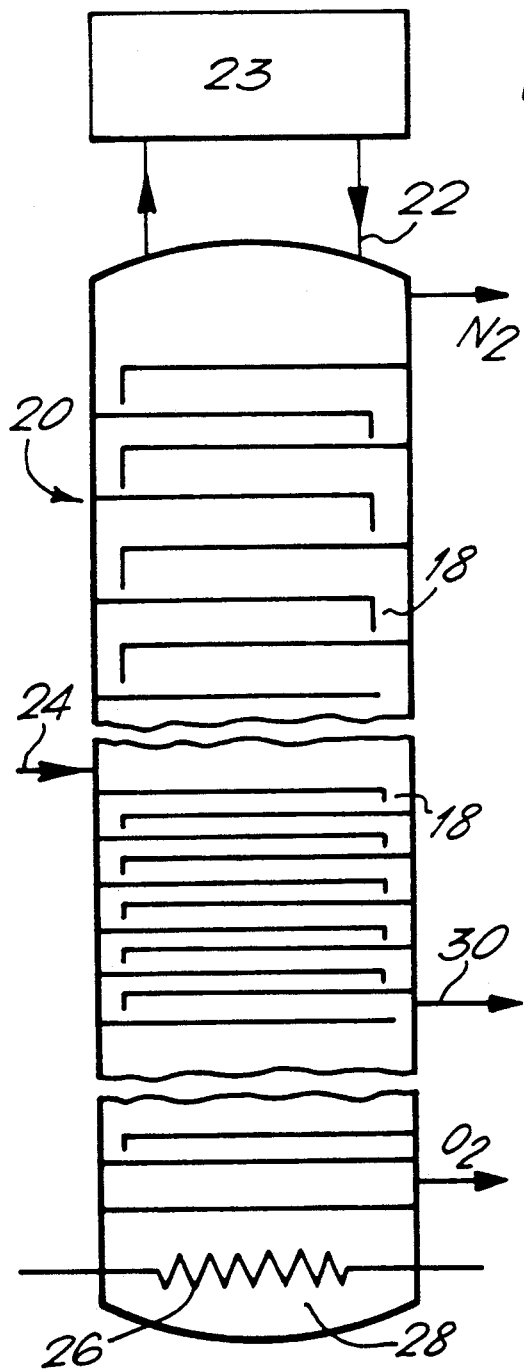
FIG. 8 is a schematic diagram of a distillation column employing trays as shown in FIG. 1.

The operation of the kind of tray shown in the drawings in a distillation column is shown in FIG. 8. Downcomers 18 are provided so as to conduct the liquid from the outlet edge 10 of each tray to the inlet portion 12 of the tray immediately below it. The column 20 shown in FIG. 8 represents a column used to used separate purified air from which carbon dioxide and water vapour have been removed. Liquid nitrogen is introduced into the column at the top from a condenser 23 through an inlet 22 and the air to be separated is introduced into the column 20 at an intermediate region through an inlet 24. There is a reboiler 26 situated in a sump 28 at the bottom of the column 20 so as to give an upward flow of oxygen gas. There is thus an upward flow of gas which comes into contact on the trays with liquid descending the column. The gas as it ascends the column becomes progressively richer in nitrogen and the liquid as it descends the column becomes progressively richer in oxygen. Nitrogen and oxygen products may therefore be withdrawn from the top and bottom of the column respectively. It is to be appreciated that the air introduced into the column 20 includes argon as well as oxygen and nitrogen. A maximum argon concentration tends to occur below the level of the air inlet 24. Typically, an argon-enriched liquid or gas may be withdrawn from an column through the outlet 30 for further separation. Since argon and oxygen have very similar volatilities, there needs to be a relatively large number of trays between the level of the argon-enriched fluid withdrawal and the level at which the air is introduced. Since liquid-gas contact trays or devices according to the invention typically have relatively low pressure drops associated with their use they can therefore with advantage be used in the aforementioned section of the column 20 between the level of air introduction and the level from which the argon-enriched fluid is withdrawn. The rest of the trays in the column may also be in accordance with the invention or may be of the conventional sieve tray design.

The liquid-gas contact device according to the invention makes possible efficient liquid-gas contact at relatively low pressure drop. The invention also makes possible a reduction in the number of trays required to perform a given separation (the reduction being in comparison with a conventional sieve trays). In consequence, the height of the liquid-vapour contact column may be reduced, with various attendant economic advantages. An overall reduction in the running costs of the column may also be achieved.

Figure 2:
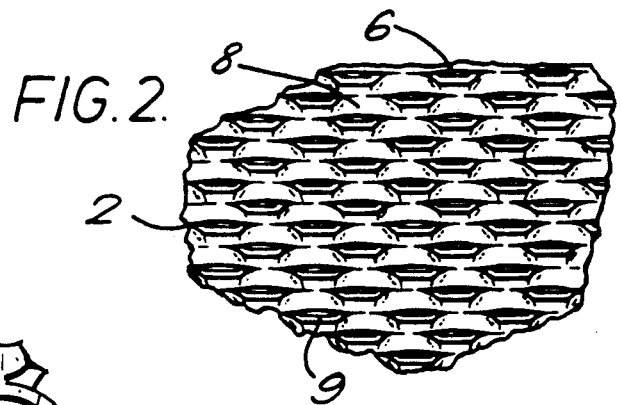
FIG. 2 is a perspective view of a fragment of expanded metal suitable for use as the lower sheet in FIG. 1.
Figure 3:
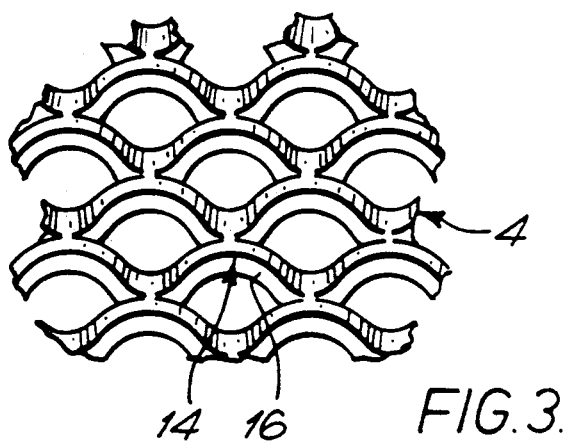
FIG. 3 is a perspective view of a fragment of expanded metal suitable for use as the upper sheet in FIG. 1.

The liquid-gas contact device according to the invention is not limited to the use of the specific expanded metal sheets shown in FIG. 2-4 of the accompanying drawings. In FIGS. 5-7 there is illustrated an alternative liquid-vapour contact device according to the invention which uses alternative kinds of expanded metal as the sheets 2 and 4. In particular sheet 4 shown in FIG. 6 has a larger mesh size than that shown in FIG. 3. The term 'mesh size' as applied to the upper sheet refers to the distance along the direction of liquid flow between opposed corners of the mesh defined by the strands 14 of the upper sheet.

Experiments have been performed using different combinations of expanded metal sheets 2 and 4 to separate a boiling mixture of methanol and water. The trays use are defined in Table I below and the results obtained in Table II below.

TABLE I

| Tray Number | Lower Sheet 2 | Upper Sheet 4 |
| --- | --- | --- |
| 1 | Expamet 940 mm | Expamet 601A |
| 2 | Expamet 940 mm | Expamet 1716 |
| 3 | Expamet 801A | Expamet 601A |
| 4 | Expamet 801A | Expamet 1716 |
| 5 | Expamet 801A | Expamet 1294 |

Expamet is the trademark of The Expanded Metal Company Limited, PO Box 14, Hartlepool, England.

Each of the trays 1-5 in Table 1 had a diameter of 3.8 cm and employed an outlet weir of 2 mm height along the edge 10.

The trays 1-5 were designed so as to enable indications of the effect of increasing the mesh size of both of the lower sheet 2 and the upper sheet 4 to be gained. Expamet 801A has a larger mesh size than Expamet 940 mm, and Expamet 1294 has a larger mesh size than Expamet 1716 which in turn has a larger measure size than Expamet 601A.

TABLE II

| Run No: | Tray No: | Inlet Comp mf MeOH | Outlet Comp mf MeOH | Point Efficiency Eog percent |
|---|---|---|---|---|
| 1 | 1 | 0.7814 | 0.8862 | 87 |
| 2 | 1 | 0.7414 | 0.860 | 86 |
| 3 | 1 | 0.7111 | 0.8443 | 81 |
| 4 | 2 | 0.7193 | 0.866 | 92 |
| 5 | 2 | 0.7386 | 0.8708 | 90 |
| 6 | 2 | 0.754 | 0.877 | 89 |
| 7 | 3 | 0.7484 | 0.8629 | 81 |
| 8 | 3 | 0.6830 | 0.8079 | 71 |
| 9 | 3 | 0.6791 | 0.8049 | 69 |
| 10 | 4 | 0.684 | 0.835 | 84 |
| 12 | 4 | 0.618 | 0.7975 | 84 |
| 13 | 4 | 0.586 | 0.764 | 77 |
| 14 | 4 | 0.579 | 0.765 | 79 |
| 15 | 4 | 0.4786 | 0.6963 | 75 |
| 16 | 4 | 0.443 | 0.671 | 74 |
| 17 | 5 | 0.469 | 0.696 | 77 |
| 18 | 5 | 0.564 | 0.766 | 82 |
| 20 | 5 | 0.632 | 0.805 | 84 |

The results show that for the same upper sheet 4, the smaller the mesh size of the lower sheet 2 the higher the point efficiency. The results also show for the same mesh size in the lower sheet 2, increasing upper sheet mesh size gives higher point efficiency. In general, it is preferred that mesh size of the upper sheet 4 be relatively large as increasing mesh size helps to reduce the pressure drop associated with the tray.

In one example using tray No 2 in the distillation of a methanol-water mixture, a liquid loading of 20 cm$^3$ per cm of outlet weir per second and a superficial vapour velocity of 1.6 m s$^{-1}$ were employed.

We have also successfully used the trays set out in Table III to distil water-methanol mixtures.

TABLE III

| Tray No | Lower Sheet 2 | Upper Sheet 4 |
|---|---|---|
| 6 | Expamet 607A | Expamet 2089 |
| 7 | Expamet 408 | Expamet 1196 |

It is also to be appreciated that the design of a liquid-gas contact device or tray according to the invention depends on the surface tension of the liquid that flows across the tray and that trays which are suitable for fractionating water-methanol mixtures will not necessarily be suitable for fractionating air. In general air has a lower surface tension than the water-methanol mixture which will make possible the use of even smaller mesh sizes in the lower sheet 2.

The expanded metal sheets may be of any suitable metal depending on the conditions to which the trays will be subjected to in use. Preferably, at cryogenic temperatures expanded metal sheets of aluminium or an aluminium alloy are employed, although stainless steel may alternatively be used.

Various changes and modifications may be made to the trays according to the invention. For example, it is not necessary that the upper sheet 4 has a uniform mesh size: the sheet 4 may have a wider mesh size at the sides of the tray than it has in line with the inlet and outlet edges thereof.

We claim:

1. A liquid-gas contact device comprising: a liquid-gas contract tray having, a liquid-bearing surface along which in use liquid is able to flow from a liquid receiving edge of the liquid-bearing surface to an opposed liquid outlet edge thereof, a multiplicity of elongate apertures in the tray for the passage of gas from below to above the tray, each aperture having a gas deflector associated therewith and being so disposed as to impart to the gas a component of velocity in a direction toward the liquid outlet edge; and at least several liquid flow impedance members overlying the liquid-bearing surface between said liquid receiving edge and said outlet edge; the deflectors and flow impedance members having a height such that in operation of the device they are fully submerged in the liquid flowing thereacross.

2. The device as claimed in claim 1, in which the tray has a percentage open area of 20% to 30%.

3. The device as claimed in claim 1, in which each elongate aperture is formed as a slit and has a tongue associated therewith which functions as the gas deflector.

4. The device as claimed in claim 3, said device being a distillation tray.

5. The device as claimed in claim 3, said device being installed in a distillation column.

6. The device as claimed in claim 3, in which the tray has a percentage open area of 15 to 50%.

7. The device as claimed in claim 3, in which the tray comprises a sheet of expanded metal.

8. The device as claimed in claim 3, in which the liquid flow impedance members take the form of weirs disposed and arranged so as to control the liquid velocity on the liquid-bearing surface to prevent such velocity from reaching so great a magnitude that the residence time for the liquid on the tray is insufficient for adequate gas-liquid contact to take place.

9. The device as claimed in claim 8, in which the distance between adjacent weirs along the general direction of liquid flow is from 2 to 5 cm.

10. The device as claimed in claim 9, in which the weirs are provided by strands of a sheet of expanded metal overlying the tray.

11. The device as claimed in claim 10, in which the sheet of expanded metal overlying the tray has a mesh size in the general direction of liquid flow of from 2 to 5 cm.

12. The device as claimed in claim 3, in which each slit is disposed such that its longer dimension is parallel to the inlet and outlet edges of the tray.

13. The device as claimed in claim 12, in which the slits each have an average size of less than 1 mm in the shorter dimension and an average size of less than 2.5 mm in their longer dimension.

14. The device as claimed in claim 13, in which the slits each have an average size of less than 0.5 mm in their shorter dimension.

15. A liquid-gas contact device comprising: a lower sheet of expanded metal having, a liquid-bearing surface along which in use liquid flows from a liquid receiving edge of the liquid-bearing surface to an opposed liquid outlet edge thereof, a multiplicity of elongate apertures for the passage of gas from below to above the lower sheet of expanded metal, each aperture having a gas deflector associated therewith and being so disposed as to impart to the gas a velocity in a direction toward the liquid outlet edge; and an upper sheet of expanded metal lying on the lower sheet of expanded metal and having strands defining at least several liquid flow impedance members overlying the liquid bearing surface between said liquid receiving the outlet edges of the liquid-bearing surface; the liquid deflectors and flow impedance members having a height such that in operation of the device they are fully submerged in the liquid flowing thereacross.

* * * * *